United States Patent [19]

Distelberg et al.

[11] Patent Number: 5,452,460
[45] Date of Patent: Sep. 19, 1995

[54] METHOD AND APPARATUS FOR CREATING SECURE PSEUDO-TERMINAL LINKS

[75] Inventors: Robert J. Distelberg, West Hurley; John H. Case, Kingston; Richard A. Fabish, Staatsburg, all of N.Y.

[73] Assignee: International Business Machines Corporation, Armonk, N.Y.

[21] Appl. No.: 9,519

[22] Filed: Jan. 27, 1993

[51] Int. Cl.⁶ .................... G06F 13/00; G06F 13/14
[52] U.S. Cl. ...................... 395/700; 364/242.94; 364/284; 364/DIG. 11
[58] Field of Search ................ 395/650, 700

[56] References Cited

U.S. PATENT DOCUMENTS

| | | | |
|---|---|---|---|
| 4,652,698 | 3/1987 | Hale et al. | 380/24 |
| 4,672,572 | 6/1987 | Alsberg | 364/900 |
| 4,825,354 | 4/1989 | Agrawal et al. | 364/200 |
| 4,882,752 | 11/1989 | Lindman et al. | 380/24 |
| 4,885,789 | 12/1989 | Burger et al. | 380/25 |
| 4,941,173 | 7/1990 | Boule et al. | 380/25 |
| 4,949,248 | 8/1990 | Caro | 364/200 |
| 5,012,515 | 4/1991 | McVitie | 380/49 |
| 5,032,979 | 7/1991 | Hecht et al. | 364/200 |
| 5,073,933 | 12/1991 | Rosenthal | 380/25 |
| 5,124,909 | 6/1992 | Blakely et al. | 395/200 |

OTHER PUBLICATIONS

"Porting UNIX to the 386: the basic kernel" by William Jolitz et al. Dr. Dobb's Journal Nov. 1991 vol. 16 No. 11 p. 46(9).

"Design and Implementation of a Secure Terminal Gateway" by Rich Cramer et al. 1988 IEEE.

*Primary Examiner*—Kevin A. Kriess
*Assistant Examiner*—Michael Richey
*Attorney, Agent, or Firm*—William A. Kinnaman; Peter L. Michaelson; Jeffery J. Brosemer

[57] ABSTRACT

A method and apparatus, operating within a kernel of a UNIX-based host computer, that ensures that no unauthorized users or processes have accessed a pseudo-terminal (pty) slave file within a pty device driver prior to an authorized process accessing the pty slave file. Specifically, upon receiving, from an application program, a request to open a pty master file to form a pty device driver, the request is granted by the kernel only if the pty master file and pty slave file are presently closed. Similarly, a request to open a pty slave file to form a pty device driver is granted by the kernel only if the pty master file is open and a user identification of an application attempting to open the slave file is identical to a user identification of the application program which opened the master file. In this manner, a pseudo-terminal link between the pty master file and the pty slave file is secure from unauthorized processes being surreptitiously connected to the pty slave. Additionally, the owner and access permission codes of the open pty slave file are changed thereby further restricting access thereto.

21 Claims, 6 Drawing Sheets

METHOD AND APPARATUS FOR CREATING SECURE PSEUDO-TERMINAL LINKS

BACKGROUND OF THE DISCLOSURE

1. Field of the Invention

The invention generally relates to apparatus and concomitant methods of providing security for computer systems, and particularly, to apparatus and concomitant methods for establishing secure access to computer application programs using a pseudo-terminal link.

2. Description of the Prior Art

"UNIX" (a registered trademark of UNIX System Laboratories, Inc.), operating systems generally refers to a family of computer operating systems. UNIX operating systems provide task dispensing, a file system, and input/output (I/O) control for computer systems. However, certain computer operating systems exist which utilize command structures that are similar to UNIX command structures but are not known as UNIX operating systems per se, i.e., those operating systems being known as "UNIX-like" operating systems. With this in mind, the following discussion of UNIX-based computer systems, i.e., computer systems using a UNIX operating system, encompasses computer systems which utilize UNIX-like operating systems as well as UNIX operating systems.

Generally, a UNIX system has its software logically arranged in a hierarchical manner. Within this hierarchy, a lowest level contains device input/output (I/O) programs known as device drivers which interact directly with hardware such as printers, terminals, memory, and the like; a higher level contains a file system for storing and manipulating files; and the highest level, known as the application level, contains application programs which interact with the hardware through the operating system. The entire operating system, containing the file system and device drivers, is commonly known as a "kernel". In addition to the file system and device drivers, the kernel also provides ancillary services such as memory management and central processing unit (CPU) scheduling.

The application level typically contains executable files or application programs which request services from the kernel using instructions known as "system calls". Using system calls, an application program can open assorted files to retrieve information, start other executable routines, produce data and retrieve data.

In a UNIX environment, file security is generally provided by the kernel through a technique, described below, that alters a set of file protection flags or codes. These flags control who may access particular files. However, some types of files, in particular pseudo-teletype (pseudo-tty) character-special files, must be accessible, at least initially, to any process (an executed application program) executed on the UNIX-based computer. Generally, pseudo-tty character-special files facilitate network communications between computers. Consequently, to enable any process to communicate with other computers, the file protection flag settings associated with pseudo-tty character-special files generally are set to allow any process to initially access the files. Since the kernel permits any process to access these files, once the file is opened, an additional level of security must be provided by each process that accesses these files. Typically, this security is effectuated by a subroutine within the application program that instructs the kernel to alter the protection flags of each open pseudo-tty character-special file.

The application programs used to facilitate network communications are known as "communications application" programs. To achieve the additional level of security, each communications application program must be executed as an authorized (typically referred to as a "SUPERUSER") process. As such, to provide security, the authorized process can subsequently request the kernel to alter the file protection flags and ownership of the pseudo-tty character-special files.

In some instances, these authorized processes do not provide adequate security, allowing malicious users to receive data intended to flow into, or out from, the UNIX-based computer through its terminal connection to the network. Specifically, when a communications application program, such as telnet, rlogin, or X-windows, uses a specific type of character-special file known as a pseudo-terminal to facilitate connections between a terminal and an application program, certain critical security issues arise. Before discussing the particulars of these security issues, the complexity of these issues necessitates a discussion of the basics of pseudo-terminal utilization.

A "pseudo-terminal" is a special type of pseudo-tty character-special file controlled by a set of device driver routines (hereinafter the combination of the device driver routines with the necessary pseudo-tty character-special file is referred to as a pseudo-terminal (pty) device driver). The pty device driver permits a communications application program (hereinafter referred to as a "communications application") to interface to other application programs as if that communications application was an actual terminal connected to the UNIX-based computer. A specific example of a communications application is "telnet". Specifically, if a computer connected to a network at a remote site, known as a remote computer, desires to connect to a UNIX-based host computer that is connected to the same network, the remote computer connects to the host computer via telnet. In this regard, using conventional communications software, the remote computer contacts the telnet communications application within the host computer and requests access thereto. Two pty device drivers within the host computer are used to facilitate a pseudo-terminal connection between the telnet communications application being accessed by the remote computer and any user application within the host computer. Subsequently, the host computer, and any user application executed thereupon, views the remote computer as a terminal that is directly connected to the host computer. The remote computer and the intervening network become transparent to the user application.

More specifically, the process by which a remote login from a remote computer to a UNIX-based Host computer is accomplished begins with the remote computer accessing, via the network, a remote login communications application resident on the host computer. Typically, the remote login application is either "riogin", which assumes the host and remote computers are both UNIX-based computers or "telnet" which is a standard INTERNET application that most Transmission Control Protocol/Internet Protocol (TCP/IP) implementations support regardless of the operating system of the host computer.

Once the remote computer has accessed a remote login communications application, the application executes a "fork" system call. The "fork" system call creates a copy of the process that was executing, in this instance, a copy of the remote login application. Consequently, the copy of the remote login application, known as a child process, continues to interact, via the network, with the remote computer. Meanwhile, the remote login application, known as a parent process, becomes dormant and awaits the next remote computer request for access to the host computer.

The child process (hereinafter referred to as a "server process") opens a pair of pseudo-tty character-special files known as pseudo-terminal (pty) files. The pair of pty files comprise a pty "master" file and a pty "slave" file. The pty master file is logically associated with the pty slave file; a so-called pseudo-terminal link connects the two files together. In this manner, commands and other data entering the master file pass to the slave file and vice versa. When the pty files are opened, each is controlled by a set of device driver routines such that the combination of each of the pty files with their respective device driver routines forms a pty logical link between the pty files.

Next, the server process executes a "fork" system call which creates a copy (a child) of the server process. Now, each of these processes, the server process and its child, has an open connection to both the pty master and slave files. To end the dual connection, the server process closes its connection to the pty slave file. Similarly, the child of the server process closes its connection to the pty master file. As a result, a logical communications path exists between the server process and its child. The child process views this path as a terminal connection, i.e., a connection from the child process directly to a terminal. The child process then issues an "exec" system call for a login shell application to facilitate remote computer login to the host computer. In this manner, the pty slave file becomes connected to the login shell application. Consequently, the remote computer will operate in a similar manner to a terminal connected to the host computer. Any information typed on the remote computer keyboard forms an input to the login shell application and any information returned from that application is transferred to a display on the remote computer. The user of the remote computer may now proceed to login to the host computer and access information therein.

To facilitate security of the communication between the remote computer and the host computer, a communication application such as telnet performs certain security precautions after opening the pty files. Specifically, after the communication application in the form of the server process opens the pty master and slave files, the server process alters access permission code and ownership of the pty slave file to restrict subsequent access to this file by other users. To enable the access permission code and ownership to be changed, each application which alters the pty slave file access and ownership must have superuser status.

When the server process first opens a pty file, the permission codes, are typically "rw.rw.rw", wherein each field from left to right corresponds to a permission code assigned to the current owner, the group in which the owner is a member, and the rest of the world. Within the permission codes, "r" indicates that a user can read the file; "w" indicates that a user can write to the file; "x" indicates that the file can be executed. Note that in this particular example "x" is not used, i.e., the file is not executable, therefore, the "x" is replaced with a dot (.). Typically, the initial owner of the pty files is the superuser name, "root", and the permission codes enable any user to access the files on demand. Therefore, in the case of pty files, both the pty master file and the pty slave file can initially be accessed by any process.

To establish a secure pty link, once opened, the server process changes: (a) the access permission codes of the pty slave file to "rw..w. . . .", and (b) the owner of the pty slave file to an effective user identification (UID) of the server process. After alteration of the codes and owner, only the present user can read and write to the opened pty slave file. Additionally, those users in the group which the implementation has defined are permitted to write to the file. However, those in the outside world do not have access to the open pty slave file at all. This access restriction presents a limited amount of security. However, since the application program is responsible for securing the open pty slave file, it is foreseeable that some applications may not include such security measures. Thus, the permission codes and ownership would not be altered and consequently, open pty files would be accessible by all users at all times.

To circumvent the limited security afforded by altering the access permission codes and owner of the pty slave file, an unauthorized user can exploit so-called "timing windows" that exist between opening the pty files and changing the permission codes and ownership. A timing window is a time interval that occurs between the act of opening the files and the act of changing the permission codes and the ownership of the open files. Typically, the acts of opening a file and changing the ownership and permission codes are non-atomic operations. Generally speaking, a non-atomic operation is an operation which accomplishes a particular task using multiple system calls. The existence of timing windows has traditionally been referred to as the "time of access versus time of check" problem. Because of the existence of timing windows, an unauthorized user can invoke an unauthorized process to facilitate compromising file security by opening a pty file prior to the ownership/permission code change. Once a file has been opened by a process, a subsequent change in permissions or ownership of the opened file does not affect access by the process that previously opened the file. Consequently, once the unauthorized process has accessed the pty slave file, the authorized process cannot disconnect the unauthorized process from the file by changing the permission codes and ownership of that file. Thus, the unauthorized user remains connected to the pty slave file. In this manner, the unauthorized process compromises the security of the link between the pty master file and the pty slave file. Therefore, the unauthorized process may receive any data transmitted by the remote computer, including user id and password information. This information can be stored by the unauthorized user for later use to compromise security of the host computer. Alternatively, the unauthorized process can send misleading data to the remote computer. In this manner, the unauthorized process can request the user of the remote computer to transmit his or her user id, password or other confidential information to the unauthorized process. Such malicious action would thus compromise security of the host computer.

Thus, a need exists in the art for a method and apparatus for creating a secure link between a pty master file and a pty slave file. Additionally, such a method and apparatus should relieve application programs of the responsibility of security and remove the necessity of the application running as a superuser, this method and apparatus should reside within the kernel.

SUMMARY OF THE INVENTION

Accordingly, an object of the invention is to create a secure link between a pty master file and a pty slave file whenever an application program requires a pseudo-terminal link.

Another object of the present invention is to relieve the application programs of the responsibility of performing security functions to protect the pseudo-terminal link.

Another object of the present invention is to relieve the application program of the requirement that it operate as a superuser to perform security functions to protect the pseudo-terminal link.

These and other objects are achieved by our inventive technique, operating within the kernel, that ensures that no unauthorized users or processes have accessed a pty slave file prior to an authorized process accessing the pty slave file. In general, this technique will only permit access to pty master and slave files when the status of those files fulfills certain conditions (rules). Additionally, the technique changes the permission codes and ownership of the pty slave file before any unauthorized process may attempt to open the same pty slave file.

Specifically, upon receiving from an application program a request to open a pseudo-terminal (pty) master file, the request is granted only after fulfilling a first set of rules. The first set of rules are that the pty master file has not been previously opened and that the pty slave file, associated with the pty master file to be opened, is presently closed. If the present status of the pty master file and the pty slave file fulfills these rules, permission is granted to open the pty master file.

Subsequently, our invention, upon receiving a request from an application program to open a pty slave file, grants the request only if a second set of rules is fulfilled. The second set of rules are that the pty slave file has not been opened prior to the opening of the associated pty master file and that the user identification (UID) of the process which requests opening the pty slave file has the same effective UID as the process which previously opened the pty master file. If these rules are fulfilled, permission is granted to open the pty slave file. In this manner, a pseudo-terminal link between the pty master file and the pty slave file is secure from unauthorized processes being surreptitiously connected to the pty slave file.

To further enhance security, our inventive technique changes the owner and access permission codes to restrict access to the pty slave file. This access restriction is accomplished as an atomic operation occurring when the application program first opens the pty slave file. Thus, the owner of the pty files is changed from a superuser name, typically "root", to the effective UID of the application program requesting access. Additionally, the access permission codes are changed from "rw.rw.rw." to "rw..w. . . ." to allow read and write access to the present user (owner), to allow write access only to users within a specific group of users defined by the operating system, and to allow no access to other users outside that group.

Importantly, our inventive technique for providing pseudo-terminal link security is executed within the kernel of a UNIX-based computer system. Specifically, our security technique is incorporated into the program routines that are executed in response to the "open" system calls made by application programs to open the pty master and slave files. As such, our invention relieves the burden of providing security measures for the pseudo-terminal link from the application programs that utilize pseudo-terminals. Additionally, by using a security technique within the kernel, the application programs no longer need to operate as a superuser to facilitate altering the permission codes and ownership of the pty slave file.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
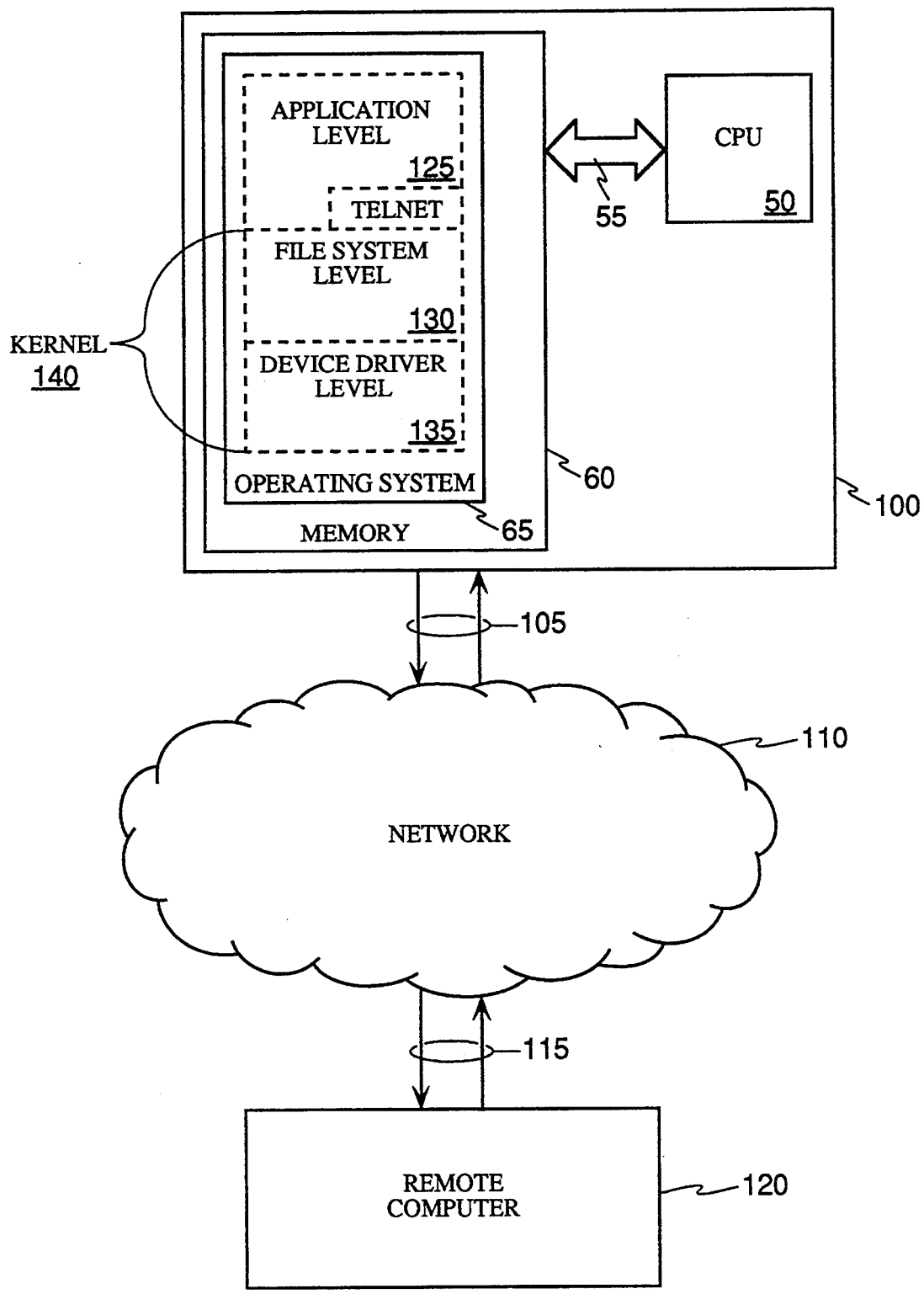
FIG. 1 is a high level block diagram depicting UNIX-based host computer 100 operating in a network environment.

Our invention operates with computer systems, that use UNIX or UNIX-like operating systems. In particular, our invention could function within a model ES/9000 computer system running the Advanced Interactive Executive (AIX) operating system. Both AIX and ES/9000 are trademarks of International Business Machines Corporation of Armonk, N.Y.

To ensure that responsibility for performing security functions is removed from the application level, our invention resides at the device driver level of the kernel. Particularly, our invention is included in a process that opens, upon a system call from an application program, pty master and pty slave files. Thus, whenever any application program opens a pty master and pty slave file, our invention will provide a secure link between these two files without relying upon the application program to supply any security measures to protect this link.

Generally, our invention operates by requiring various rules to be fulfilled prior to the kernel permitting an application program (process) to open both the pty master and pty slave files. These rules are as follows:

1) A pty master file must be presently closed when an open request is made by an application program, i.e., a pty master file can only be opened once.

2) A pty slave file, associated with the pty master file to be opened, must be presently closed when the pty master file is opened.

3) A pty slave file cannot be opened by the kernel before its associated pty master file is opened.

4) A process which first opens the pty slave file must have the same effective user identification (UID) as the process that previously requested opening the pty master file.

The first and second rules form a first set of rules that must be fulfilled before the kernel opens the pty master file. Similarly, the third and fourth rules form a second set of rules that must be fulfilled before the kernel opens the pty slave file.

In addition, upon opening the pty slave file, access permission and ownership of the file is immediately and atomically changed to allow only the authorized user to read and write to the pty slave file. Additionally, any user within a group of users defined by the operating system of the host computer may write to the open pty slave file. Symbolically, the kernel changes the access permission from typically "rw.rw.rw." to "rw..w....". Furthermore, the kernel changes the pty slave file ownership from the current owner name, typically, but not necessarily "root" to the effective UID of a process presently requesting access to the file. Additionally, the Group Identification (GID) is changed to a group (typically, but not necessarily, named "tty") designated by the operating system of the host computer. When an application requests that the kernel close the pty slave file, and this close is a final close, the access permission and ownership of the file are returned to their original values.

By using the above rules and the immediate and atomic change of access permission and ownership of the opened pty slave file, our invention ensures that unauthorized users cannot simultaneously access the same pty slave as an authorized user. Thus, our invention provides effective security for the pseudo-terminal link between the pty master file and pty slave file.

FIG. 1 is a high level block diagram depicting UNIX-based host computer 100 connected, via network 110, to remote computer system 120. Host computer 100 contains central processing unit (CPU) 50 and memory 60. CPU 50 accesses memory 60, via bi-directional path 55. The various programs, drivers and files which facilitate network access to the host computer are stored in memory 60. Memory 60 may be, for example, formed of semiconductor random access memory, semiconductor read only memory, hard disk storage and the like, or any combination thereof, with the specific implementation of this memory not being relevant to the present invention. Generally, network 110 provides full duplex communications between remote computer 120 and network 110 as represented by lines 115. Similarly, host computer 100 connects to network 110 along a full duplex path represented by lines 105. Illustratively, network 110 is a local area network (LAN) for interconnecting a number of personal computers (remote computers). Additionally, host computer 100 is illustratively a model ES/9000 computer system manufactured by International Business Machines Corporation of Armonk, New York. Those skilled in the art will readily understand that the form of the network and the specific model of the host computer are not important to the operation of our invention. Furthermore, the hardware and software for implementing network communications is not shown in FIG. 1 because they form no part of the present invention.

As is typical of a UNIX-based host computer, within host computer 100 is a hierarchical arrangement of files and programs (executable files). The top level is application level 125, the mid-level is file system level 130, and the bottom level is device driver level 135. File system level 130 and device driver level 135 are components of kernel 140.

Generally, device driver level 135 contains conventional programs which are designed to allow a process (in application level 125) to communicate with peripheral devices such as disks, tape drives, terminals, printers and networks. A network communication application program residing in application level 125, such as "telnet" or "riogin" typically uses pseudo-terminal device drivers to simulate a terminal connection with a local application (at level 125) such as a "login shell". The remainder of this discussion will illustratively focus on using "telnet" as the network communication application. From the following discussion, the use of "riogin" will be apparent to those skilled in the art.

Figure 2:
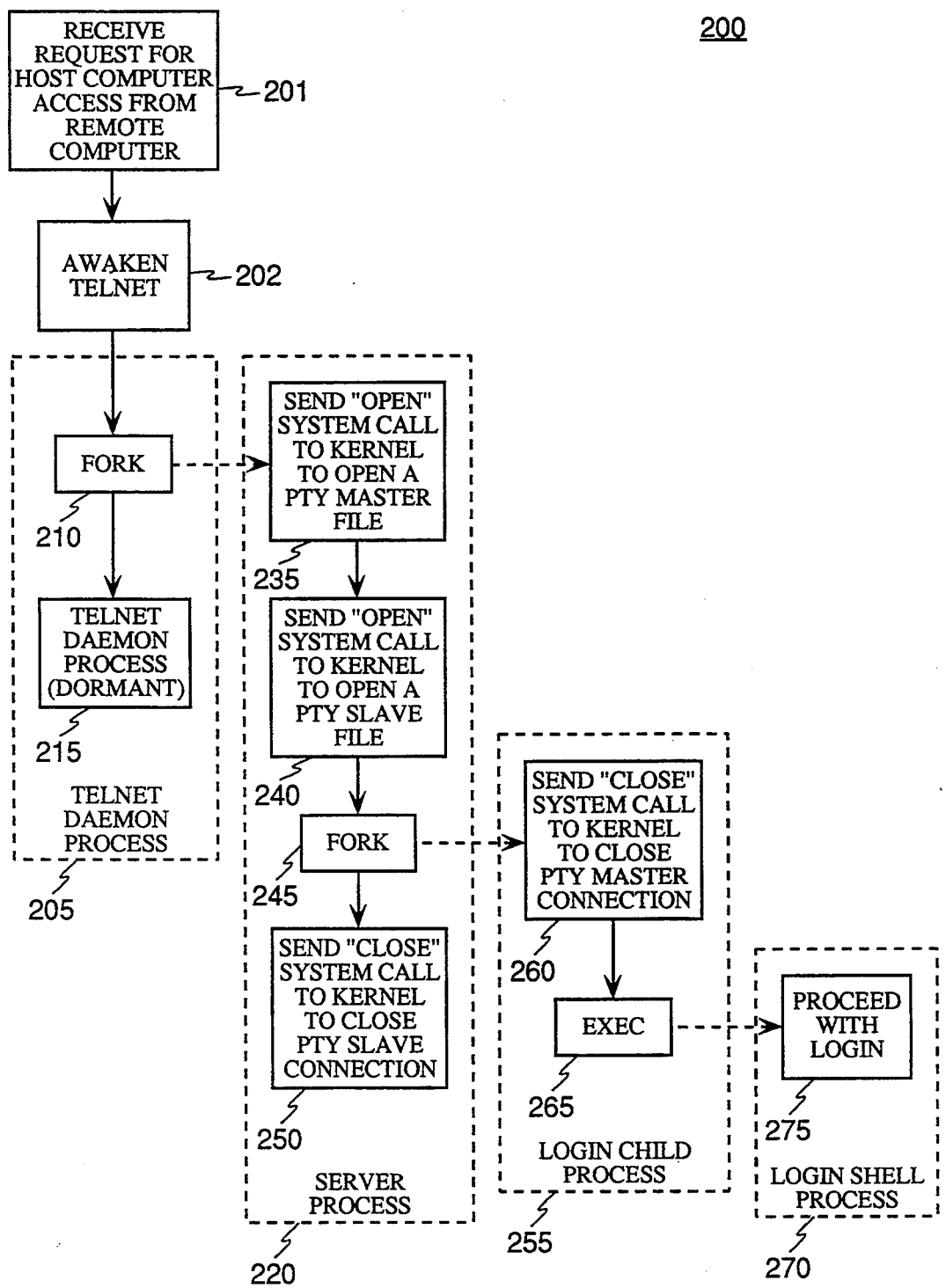
FIG. 2 is a flow chart of process 200 by which a remote computer attains access, via a network, to a UNIX-based host computer.

FIG. 2 depicts process 200 by which a communication application (telnet) opens a pseudo-terminal pair to facilitate a connection between the remote computer and a login shell process within a host computer. Process 200 initiates, at step 201, when the host computer receives a request for access from a remote computer. The received request causes, at step 202, the telnet communication application to "awaken" from a dormant state. When telnet is awakened, it is known as a "telnet daemon" process. Telnet daemon process 205 facilitates opening the pseudo-terminal pair to connect the remote computer to the host computer.

Upon receiving a connection request from the network, the process performs, at step 210, a "fork" system call to create a child process (shown and hereinafter referred to as server process 220). Server process 220 is an identical copy of telnet daemon process 205. In this manner, server process 220 can continue to process the communication from the remote computer; while telnet daemon process 205 returns, at step 215, to its dormant state and awaits another communication request.

The server process issues an "open" system call requesting, at step 235, that the kernel open a pty master file. Similarly, at step 240, the server process issues an "open" system call requesting the kernel open a pty slave file. The specific processes by which these "open" system calls open the pty master and slave files in a secure manner are discussed in detail below with respect to FIGS. 4 and 5. As shown in FIG. 2, once the kernel opens both the pty master and pty slave files, the server process then issues, at step 245, a "fork" system call which duplicates the server process. Moreover, the "fork" system call duplicates pty master and pty slave file descriptors associated with the open pty master and slave files. In this manner, both the child of the server process and the server process are connected to both the pty master and slave files. For simplicity, the child of the server process will hereinafter be referred to as a "login child" process. To achieve a pseudo-terminal link, between server process 220 and login child process 255, the server process closes, at step 250, the connection between the pty slave file and server process 220. Similarly, the login child process closes, at step 260, the connection between the pty master file and login child process 255. Afterward, the pty master file connected to server process 220 is solely linked to the pty slave file connected to login child process 255. As such, the pseudo-terminal link between the pty master file and the pty slave file connects the remote computer with the login child process. At step 265, the login child process executes, via an "exec" system call, the login shell program generating login shell process 270. The login shell process is an application program which enables, at step 275, a user, in this instance a remote computer, to login to the host computer.

Alternatively, to produce a pseudo-terminal link, server process 220 may individually only open the pty master file, and login child process 255 may individually only open the pty slave file. The pseudo-terminal link will manifest itself between these two open files. In this manner, the previously discussed steps of closing the unnecessary connections to the pty master and slave files are avoided.

Figure 3:
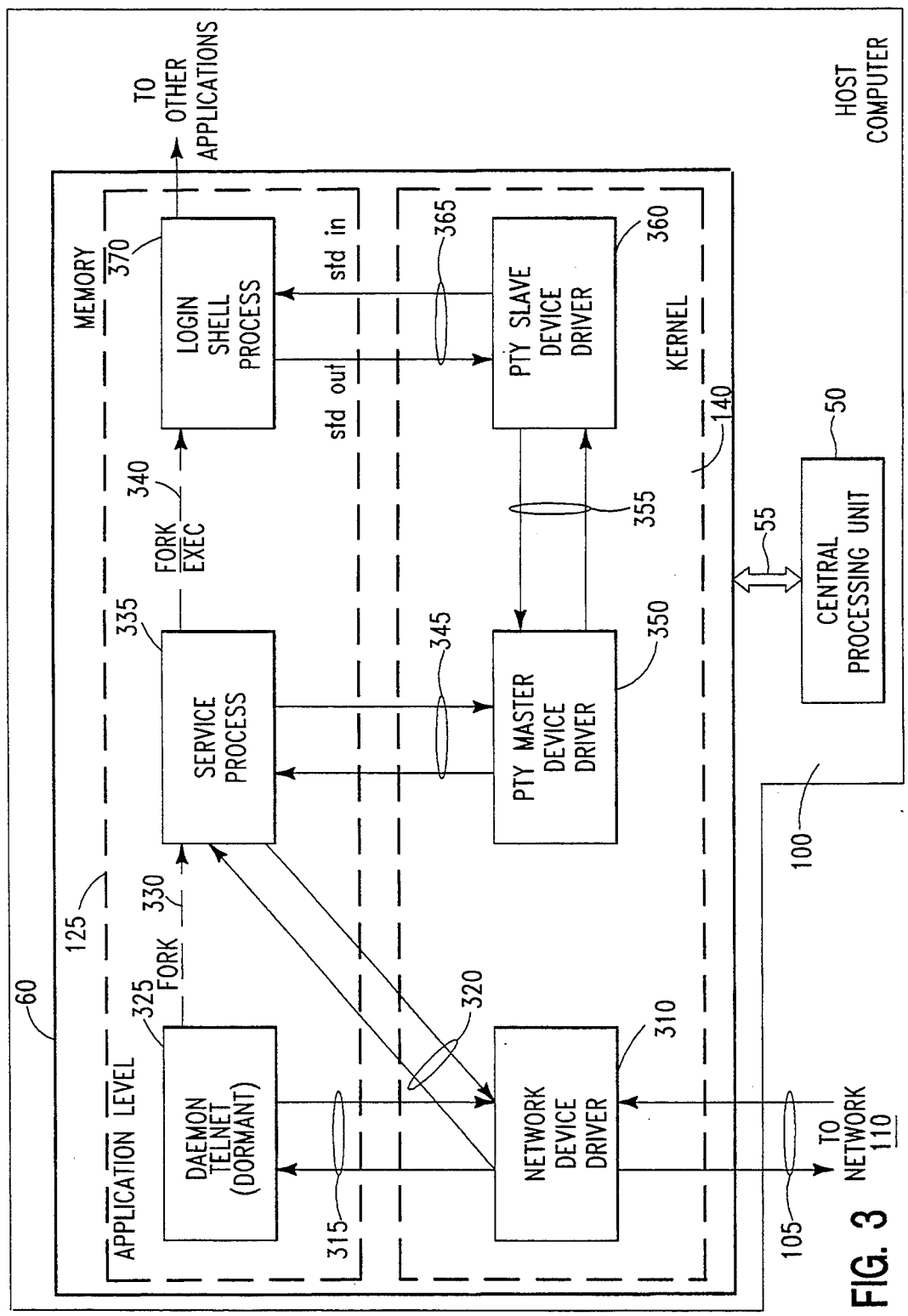
FIG. 3 is a block diagram depicting the association of the files and processes within host computer 100, shown in FIG. 1, used to implement our present invention.

FIG. 3 depicts the final connective arrangement of the various drivers and processes used to provide a connective path from network 110 to login shell process 370.

Initially, information from network 110 connects to telnet daemon process 325. This connection is generally accomplished through what is commonly known as a "socket" connection to the network. The socket connection is depicted as network device driver 310 connected, as symbolized by lines 315, to telnet daemon process 325.

As described previously, the "fork" system call, represented by dashed line 330, produces server process 335. Subsequently, telnet daemon process 325 becomes dormant awaiting the next login request from the network. Consequently, lines 320 represent connection between the socket and server process 335. Through the "fork" and "exec" system calls, shown as line 340, server process 335 creates login shell process 370. Additionally, by opening a pty master file, the server process effectuates pty master device driver 350 connecting, as represented by lines 345, to server process 335. Similarly, by opening a pty slave file, the login shell process 40 effectuates pty slave device driver 360 connecting, as symbolized by lines 365, to login process 370. Pty slave device driver 360 is linked to pty master device driver 350 along pseudo-terminal link 355. In this manner, all data written to the pty master device driver is transmitted to the pty slave device driver in a format consistent with a terminal input. Similarly, any data written to the pty slave device driver is transmitted in the same format to the pty master device driver. Consequently, the pair of pty device drivers provides the necessary terminal semantics for the remote computer (not shown) to login to the host computer.

Figure 4:
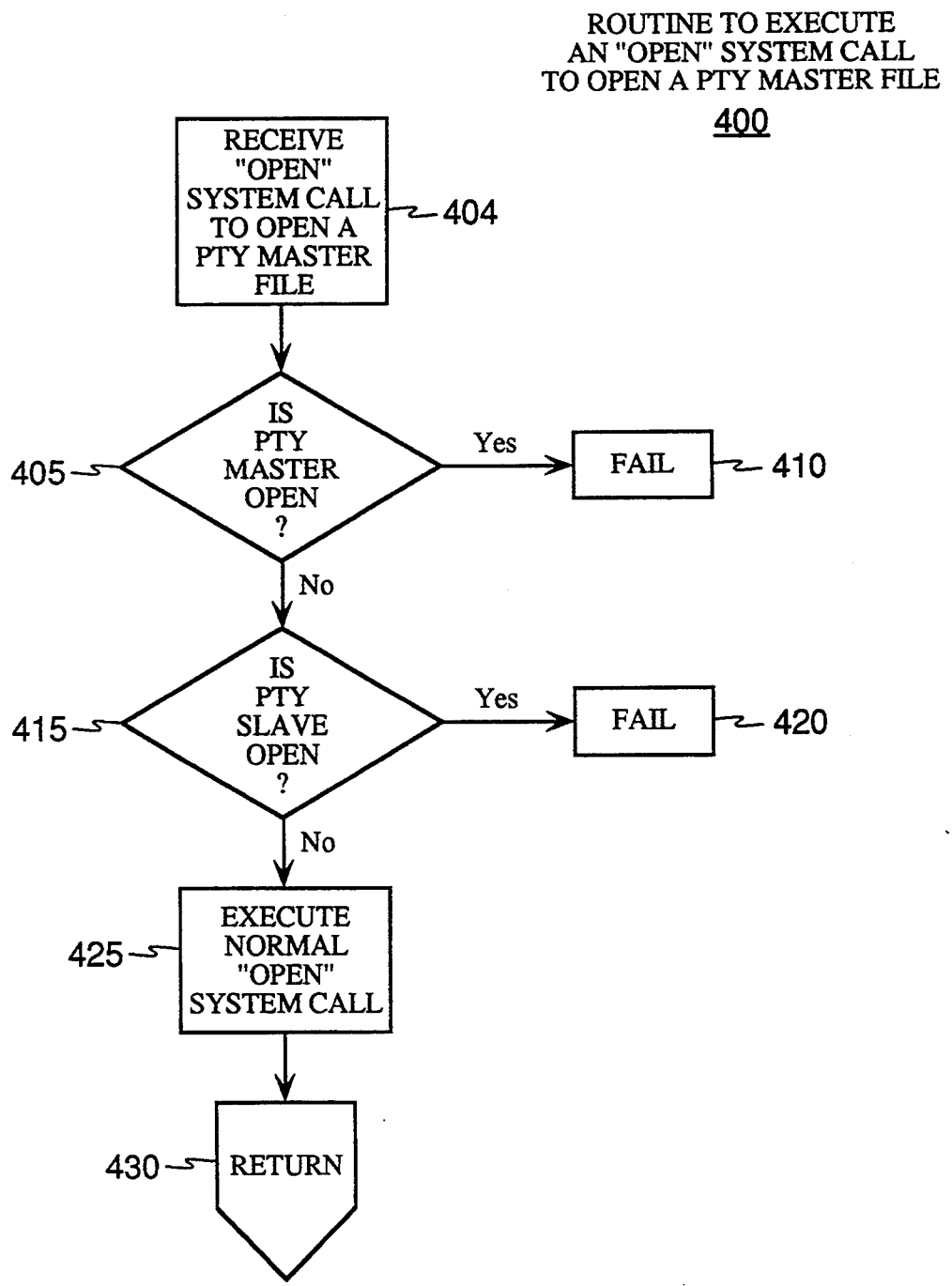
FIG. 4 is a flow chart of routine 400 for executing an "open" system call containing security measures to protect, from unauthorized access, a pseudo-terminal link between a pty master file and a pty slave file.

Kernel level 140 provides security for the pseudo-terminal link between the pty slave device driver and pty master device driver. Security measures are incorporated into a routine which executes the "open" system call for the pty master file, at step 235 in FIG. 2, and "open" system call for the pty slave file, at step 240 in FIG. 2. Specifically, FIG. 4 is a flow chart of routine 400 by which the kernel opens, at the request of the server process, the pty master file, i.e., using the "open" system call. To ensure that the pty master file is opened in a secure environment, the present state of the pty master and pty slave files must fulfill the first set of rules (rules 1 and 2) discussed above. Specifically, upon initiation of the "open" system call, at step 404, routine 400 queries, at step 405, whether the pty master file has been already opened by any process. If the pty master file is already open, the kernel deems, at step 410, the "open" system call to have failed and returns an error indicator to the server process. However, if the pty master file is not already open, the kernel deems the first rule fulfilled and the routine proceeds to step 415.

At step 415, the routine queries whether pty slave file associated with the pty master file is presently open. If the pty slave file is open, then the kernel deems, at step 420, the "open" system call to have failed and returns an error indicator to the server process. However, if the pty slave file is not presently open, the kernel deems the second rule fulfilled and the process proceeds to step 425. At step 425, a normal "open" system call is executed to open a pty master file. The term "normal 'open' system call ∞ is used to describe an "open" system call that is commonly used to open a pty file in a UNIX environment. Upon completion of the normal "open" system call, i.e., after the pty master file is opened, the routine returns, at step 430, to the server process.

Figure 5:
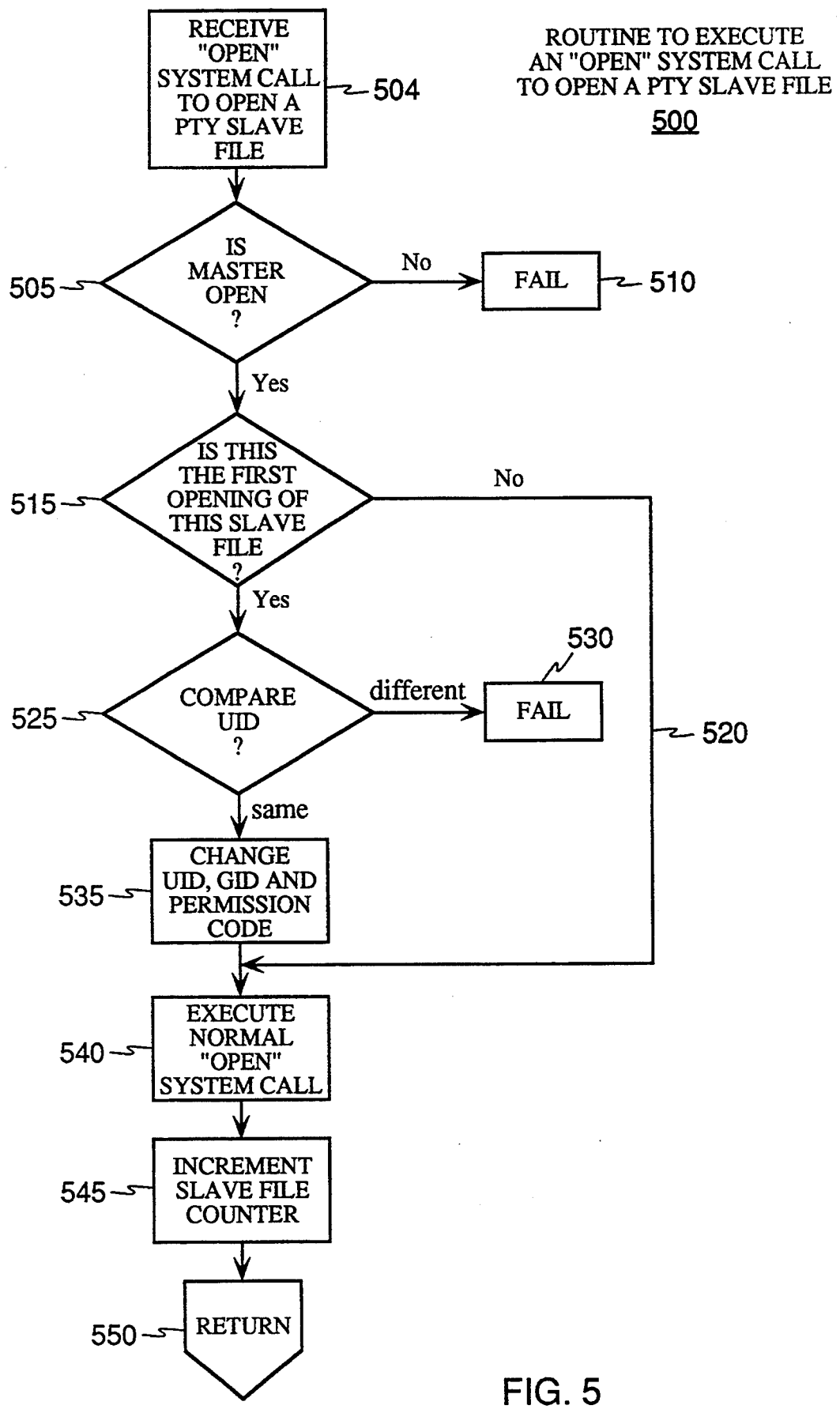
FIG. 5 is a flow chart of routine 500 for executing an "open" system call containing security measures to protect, from unauthorized access, a pseudo-terminal link between a pty master file and a pty slave file.

FIG. 5 is a flow chart of routine 500 by which the kernel opens, at the request of the server process (step 504), the pty slave file in a secure manner. To ensure that the pty slave file is opened in a secure manner, the present state of the pty master and pty slave files must fulfill the second set of rules (rules 3 and 4) discussed above. To ensure that the pty slave file cannot be opened before the pty master file is opened, the routine queries, at step 505, whether the pty master file is presently open. If the pty master file is not presently open, the "open" system call fails and the kernel sends, at step 510, an error indicator to the server process. However, if the pty master file is presently open, the kernel deems the third rule fulfilled and the routine proceeds to step 515. At step 515, the routine queries whether the present system call is the first to open this pty slave file. If this is the first "open" system call for this pty slave file, then, to facilitate file security, the kernel changes, in subsequent step discussed below, the user identification (UID), the group identification (GID) and the access permission code for the pty slave file. However, if this is an "open" system call which is subsequent to previously executed system call by, for example, another user within the designated group that is permitted to write to a previously opened pty slave file, that user is permitted access to the "open" system call routine, along path 520, without a change in UID, GID and permission codes. Thus, if the query at step 515 is answered in the negative, the routine performs, at step 540, a normal "open" system call to open the pty slave file. However, if the query at step 515 is answered in the positive, the routine compares, at step 525, the effective UID of the application process requesting access to the pty slave file with the effective UID of the process which previously opened the associated pty master file. If the effective UIDs do not match, the kernel deems, at step 530, the "open" system call to have failed, and sends an error indicator to the server process. Alternatively, if the effective UIDs match, the owner of the pty slave file is changed, at step 535, from the present name, typically "root", to the effective UID of the process requesting access to the file. In this instance, the owner name is changed to the UID of the server process. Additionally, the GID for the pty slave file can be changed to a new value as necessary, typically "tty". The specific process by which file ownership is altered is well known in the art; thus, further details of this process are not necessary.

Simultaneous with the change of the file ownership, routine 500 changes, at step 535, the access permission code for the pty slave file from a current value, typically "rw.rw.rw" to "rw..w. . . .". This access restriction prevents access to the pty slave file from any user not within the group of users defined by the operating system. In this manner, only the user opening the pty slave file for the first time will have read ("r") and write ("w") authority; any user in the specified group will have write authority such that messages can be sent to the file user while that user is logged in, e.g., messages such as an imminent system failure warning and the like; and no users outside of the group are authorized to access the presently open pty slave file. In accordance with an object of the present invention, the change in UID, GID and ownership of the pty slave file are accomplished in a single system call, i.e., an atomic operation.

The routine executes, at step 540, an "open" system call in the normal manner. At step 545, routine 500 increments a counter (slave file counter) to maintain track of the number of "open" system calls that have been completed. The count of the counter is used during a "close" system call discussed below. Routine 500 for opening a pty slave file in a secure manner returns, at step 550, to the server process. Subsequently, as described previously, the server process enables the remote computer to access the login shell and, if the remote computer is authorized, the various files and programs within the host computer.

Figure 6:
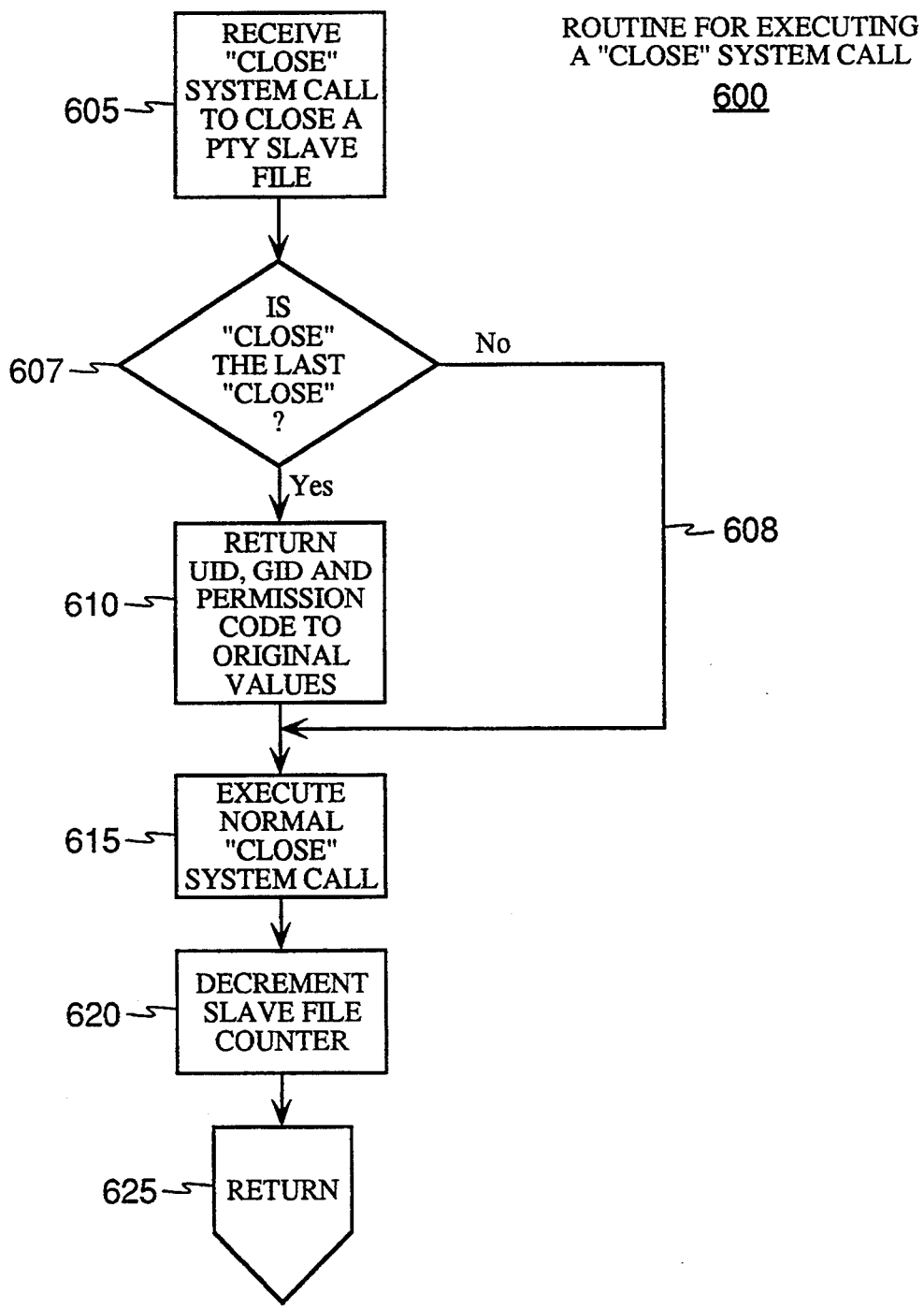
FIG. 6 is a flow chart of routine 600 for executing a "close" system call.

FIG. 6 is a flow chart of routine 600 by which the kernel closes the pty slave file upon termination of the communication path between the remote computer and the host computer. This close is known as a final or last close.

Routine 600 begins with the kernel receiving a "close" system call request, at step 605, from the application process to close the pty slave file. The slave file counter (step 545 of FIG. 5 and step 620 of FIG. 6) maintains a count of the respective number of "open" and "close" system calls that are associated with a given pty slave file since the initial opening of the file. As such, the slave file counter increments its count for each slave file "open" system call and decrements its count for each slave file "close" system call. If the count of the slave file counter is more than 1, routine 600 deems, at step 607, the current "close" system call not to be a final or last "close" system call. In this instance, the routine proceeds along path 608. Subsequently, step 615 closes the connection between the process requesting the close and the pty slave file in a normal manner. Alternatively, if the count of the slave file counter is 1, routine 600 deems, at step 607, the current "close" system call to be the final "close" system call. Consequently, at step 610, the UID, GID and permission code which were previously altered are returned to their original values in an atomic step. Afterward, at step 615, the process executes a "close" system call in the normal manner. Upon completion of the "close" system call, the routine decrements at step 620, the slave file counter. Lastly, the routine for closing the pty slave file returns, at step 625, to the server process.

By implementing the rule based access to the pseudo-terminal file pair within the "open" system call routine, the application programs are not required to provide security of the link between the pty master file and pty slave file. Using our inventive technique places the burden of security on the kernel whereby security is performed on a universal basis, that is, for all applications which are executed on the host computer. Thus, our invention protects the host computer from unauthorized access when the host computer is executing any application which performs an "open" system call to open a pseudo-terminal, including such applications as telnet, rlogin, X-windows, and the like.

Although a single embodiment which incorporates the teachings of the present invention has been shown and described in detail herein, those skilled in the art can readily devise many other varied embodiments that still incorporate these teachings.

I claim:

1. In a computer system having an operating system, a method executed within a kernel of said operating system for establishing a secure pseudo-terminal link between a pseudo-terminal master file and an associated pseudo-terminal slave file, said method comprising the steps of:

receiving, from a first application program, a first request to open said pseudo-terminal master file;

granting said first request if said pseudo-terminal master file and said pseudo-terminal slave file are presently closed, otherwise denying said first request;

opening said pseudo-terminal master file whenever said first request is granted;

receiving, from a second application program, a second request to open said pseudo-terminal slave file;

granting said second request if said pseudo-terminal master file is presently open and a first user identification associated with said first application program which opened said pseudo-terminal master file is identical to a second user identification associated with said second application program presently requesting to open said pseudo-terminal slave file, otherwise denying said second request;

changing, whenever said second request is granted, an access permission code and ownership of said associated pseudo-terminal slave file;

opening, after said access permission code and ownership are changed, said associated pseudo-terminal slave file;

such that said pseudo-terminal master file and said pseudo-terminal slave file are connected by a secure pseudo-terminal link.

2. The method of claim 1 wherein said first and second application programs are contained within a single program.

3. The method of claim 1 wherein changing step further comprises the steps of:

changing individual ownership of said pseudo-terminal slave file from a first owner name to an effective user identification associated with said second application program; and changing said access permission code from first value to a second value.

4. The method of claim 3 wherein said first owner name is a superuser name.

5. The method of claim 3 wherein said first value of said access permission code is rw.rw.rw. and said second value of said access permission code is rw..w. . . . .

6. The method of claim 3 further comprising the step of:

changing group ownership of said pseudo-terminal slave file from a first group name to a second group name.

7. The method of claim 3 further comprising the steps of:
   changing, coincident with a final closing of said pseudo-terminal slave file, said access permission code from said second value to said first value and said individual ownership of said pseudo-terminal slave file from said effective user identification to said first owner name.

8. The method of claim 7 wherein said first owner name is a superuser name.

9. The method of claim 7 wherein said first value of said access permission code is rw.rw.rw. and said second value of said access permission code is rw..w.....

10. The method of claim 7 further comprising the step of:
    changing, upon a final closing of said pseudo-terminal slave file, group ownership of said pseudo-terminal slave file from a second group name to a first group name.

11. The method of claim 10 wherein said second group name is defined by an implementation of said operating system.

12. In a computer system having an operating system, apparatus within a kernel of said operating system for establishing a secure pseudo-terminal link between a pseudo-terminal master device driver and an associated pseudo-terminal slave device driver, said apparatus comprising:
    means for receiving, from a first application program, a first request to open said pseudo-terminal master device driver;
    means for granting said first request if said pseudo-terminal master device driver and said pseudo-terminal slave device driver be presently closed, otherwise denying said first request;
    means for opening said pseudo-terminal master device driver whenever said first request is granted;
    means for receiving, from a second application program, a second request to open said pseudo-terminal slave device driver;
    means for granting said second request if said pseudo-terminal master device driver be presently open and a first user identification associated with said first application program which opened said pseudo-terminal master device driver be identical to a second user identification associated with said second application program presently requesting to open said pseudo-terminal slave device driver, otherwise denying said second request;
    means for changing, whenever said second request is granted, an access permission code and ownership of said pseudo-terminal slave device driver;
    means for opening, after said access permission code and ownership are changed, said pseudo-terminal slave device driver such that said pseudo-terminal master device driver and said pseudo-terminal slave device driver are connected by a secure pseudo-terminal link.

13. The apparatus of claim 12 wherein said first and second application programs are contained within a single program.

14. The apparatus of claim 12 wherein said means for changing further comprises:
    means (535) for changing individual ownership of said pseudo-terminal slave device driver from a first owner name to an effective user identification associated with said second application program; and
    means (535) for changing said access permission code from a first value to a second value.

15. The apparatus of claim 14 wherein said first owner name is a superuser name.

16. The apparatus of claim 14 wherein said first value of said access permission code is rw.rw.rw. and said second value of said access permission code is rw..w ....

17. The apparatus of claim 14 further comprising:
    means for changing group ownership of said pseudo-terminal slave device driver from a first group name to a second group name.

18. The apparatus of claim 14 further comprising:
    means (610) for changing, coincident with a final closing of said pseudo-terminal slave device driver, said access permission code from said second value to said first value and said individual ownership of said pseudo-terminal slave device driver from said user identification to said first owner name.

19. The apparatus of claim 18 wherein said first owner name is a superuser name.

20. The apparatus of claim 18 wherein said first value of said access permission code is rw.rw.rw. and said second value of said access permission code is rw..w. ...

21. The apparatus of claim 18 wherein said means for changing, upon closing said pseudo-terminal slave device driver, further changes group ownership of said pseudo-terminal slave file from a second group name to a first group name.

* * * * *